April 28, 1931. J. BERNHARD 1,802,496

GAS VALVE

Filed June 15, 1927

INVENTOR
J. Bernhard
BY
ATTORNEY

Patented Apr. 28, 1931

1,802,496

UNITED STATES PATENT OFFICE

JOHANN BERNHARD, OF NEW YORK, N. Y.

GAS VALVE

Application filed June 15, 1927. Serial No. 198,887.

The main object of this invention is to provide a gas valve suitable for use on all kinds of appliances such as ranges and stoves, and is equipped with means for positively locking the valve in closed position so that it may not be inadvertently opened and thereby cause asphyxiation to the person in the room.

Another object of this invention is to provide a gas valve which is provided with a safety locking means which must be first shifted to the inoperative position before the valve may be manually opened in the customary manner. By providing this locking or latching means a valve is presented which can not be inadvertently opened as by the apparel coming in contact with the lever. Two distinct manipulations of the valve must be made before the same may be opened and these movements must be made one after the other.

The above and other objects will become apparent in the description below in which characters of reference refer to like-named parts in the drawing.

Referring briefly to the drawing, Figure 1 is a front elevational view of the valve showing the latching means in closed position.

Figure 1:
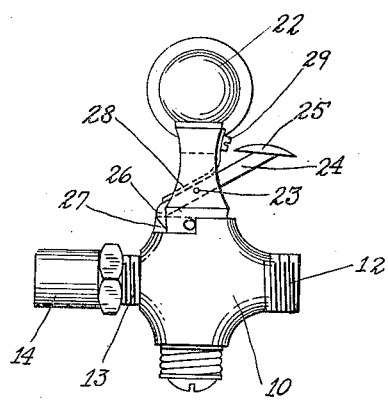
Figure 2:
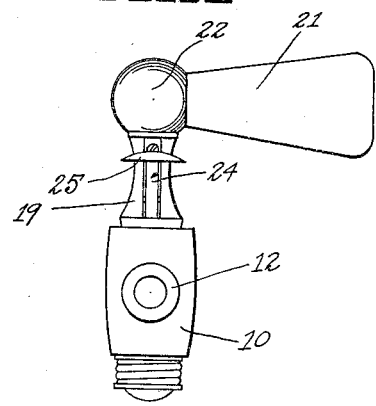
Figure 2 is an end elevational view of Figure 1 showing the latching means mounted on the stem of the valve.
Figure 3:
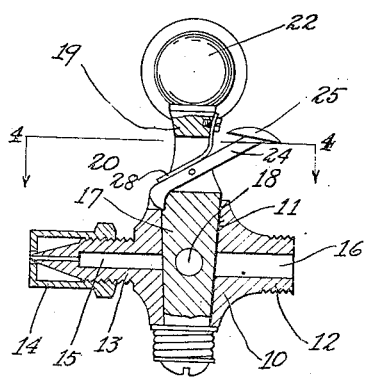
Figure 3 is a longitudinal sectional view thru the valve showing the latching means in locked position.
Figure 4:
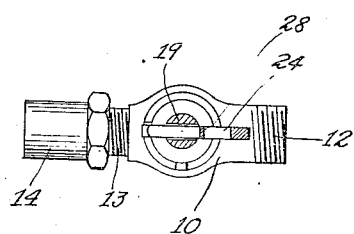
Figure 4 is a cross sectional view of the gas valve taken on line 4—4 of Figure 3, showing the location of the latching means.

Referring in detail to the drawing, the numeral 10 indicates the main body of the valve. This body has a vertical tapering bore 11 passing therethru whose greater diameter is located at the upper end of the body. Threaded nipples 12 and 13 extend from the middle of the body 10 in diametrically opposed directions. The nipple 12 has a passageway 16 extending thruout its length and is adapted to be secured to the gas fuel pipe, not shown on the drawing. The opposing nipple 13 has a similar passageway 15 extending thru it, and the threads on this nipple 13 engage a screw cap 14, which latter is adapted to be inserted into a burner or the like, not shown on the drawing. The bores 15 and 16 in their corresponding nipples are aligned with each other and communicate with the bore 11, which latter extends at right angles to the passageways 15 and 16. A tapering stem 17 is rotatably mounted in the bore 11 of the body. This stem is provided with an opening 18 which extends diametrically thru it and is adapted to align with the passageways 15 and 16 at one position. The stem 17 has a stud 19 surmounting it. The stud has a vertical longitudinal channel 20 formed therein which extends downwardly in the stud from a position near its upper end. A ball 22 is formed at the upper end of the stud 19 and extending at right angles therefrom is a handle 21, by manipulation of which the stem and stud is rotated.

Intermediate the height of the channel 20 is anchored a pin 23. This pin supports pivotally a latch lever 24 which extends in an angular direction thru the channel 20 and projects from both sides of the latter. The upper end of the latch lever is crowned by a finger button 25 which is adapted to come into contact with the thumb of the hand manipulating the handle of the valve. The lower end of the latch lever 24 is provided a hooked nose 26 which is adapted to normally register and ride in an arcuate recess 27, the latter being formed in the upper portion of the body which encircles the upper end of the tapering bore.

A flat resilient spring 28 is secured to the side of the stud 19 near its upper end by a screw 29. The free end of the spring extends angularly downward and lies in contact with the lower end of the latch lever and urges the lower end of the latter downwardly into the arcuate recess. A pin 30 forming a stop element for the rotation of the stem 17 projects from the side of the latter and is rotatable in the recess 27.

The device is adapted to provide a safety gas valve which may not be rotated from the closed to the open position until the latch lever 24 has been rotated so that the hooked nose 26 is lifted above the recess 27. This is accomplished with one movement when the handle 21 is firmly grasped. By placing the thumb adjacent the handle 21 above the button 25 and grasping the handle with the hand tightly pressure on the button is exerted downwardly and the lower end of the latch lever is rotated upwardly out of the recess thereby releasing the stem so that it can be rotated by manipulating the handle. The latch lever is normally retained in locking position by the spring 28 which lies above the latch lever and in contact therewith.

It is to be noted that certain changes in form and construction may be made without departing from the spirit and scope of the invention.

I claim:

In a valve, a body having a tapering bore therein, said body having formed thereon an arcuate recess passing around part of said bore, a tapering stem rotatably mounted in the bore of said body, a stud surmounting said stem and rising above said body and having a vertical and longitudinal channel therein, said channel passing through the axis of said stud, a pivoted lever normally positioned angularly in said channel, a right angled handle surmounting said stud, a hooked nose at the lower end of the lever normally engaging in the recess when the stem is rotated to closed position, said channel having a lower inclined seat upon which said lever normally rests, a button on the upper end of said lever, said button being located adjacent the axis of said stud and said handle, and a straight flat resilient member mounted on the stud and contacting with the engaging end of the lever for urging the latter into latching position in the recess.

In testimony whereof I affix my signature.

JOHANN BERNHARD.